United States Patent
Jensen et al.

(10) Patent No.: US 10,744,853 B2
(45) Date of Patent: Aug. 18, 2020

(54) DELIVERY DEVICE FOR PROVIDING TWO MEDIUM FLOWS GUIDED SEPARATELY FROM ONE ANOTHER, ESPECIALLY IN A FUEL-OPERATED VEHICLE HEATER

(71) Applicant: Eberspächer Climate Control Systems GmbH & Co. KG, Esslingen (DE)

(72) Inventors: Hans Jensen, Dettingen (DE); Michael Humburg, Göppingen (DE)

(73) Assignee: EBERSPÄCHER CLIMATE CONTROL SYSTEMS GMBH & CO. KG, Esslingen (DE)

( * ) Notice: Subject to any disclaimer, the term of this patent is extended or adjusted under 35 U.S.C. 154(b) by 314 days.

(21) Appl. No.: 15/679,507

(22) Filed: Aug. 17, 2017

(65) Prior Publication Data
US 2018/0050577 A1 Feb. 22, 2018

(30) Foreign Application Priority Data

Aug. 18, 2016 (DE) .......................... 10 2016 115 368

(51) Int. Cl.
*B60H 1/22* (2006.01)
*F04D 13/02* (2006.01)
(Continued)

(52) U.S. Cl.
CPC ....... *B60H 1/2203* (2013.01); *B60H 1/00428* (2013.01); *B60H 1/00471* (2013.01);
(Continued)

(58) Field of Classification Search
CPC .......... B60H 1/2203; B60H 2001/2001; B60H 2001/2281; B60H 2001/2284; F24H 3/065
(Continued)

(56) References Cited

U.S. PATENT DOCUMENTS 2,286,855 A * 6/1942 Holthouse ............ B60H 1/2212
431/28
2,508,277 A * 5/1950 Leslie .................. B60H 1/2209
237/8 A
(Continued)

FOREIGN PATENT DOCUMENTS

DE 3509349 A1 * 9/1986 ......... F28D 21/0008
DE 4002570 A1 * 8/1991 ............... F23N 5/08
(Continued)

OTHER PUBLICATIONS

"DE_19652970_A1_M—Machine Translation.pdf", machine translation, EPO.org, Sep. 23, 2019.*
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A delivery device provides two medium flows guided separately from one another in a fuel-operated vehicle heater. The delivery device includes a first delivery wheel (14) rotatable about a first rotation axis (A) for delivering a first medium, a second delivery wheel (16) rotatable about a second rotation axis (A) for delivering a second medium, as well as a drive motor (12) for driving the first delivery wheel (14) and the second delivery wheel (16). At least one delivery wheel (16) is coupled with the drive motor (12) via a magnetic coupling device (60).

20 Claims, 6 Drawing Sheets

(51) Int. Cl.
*F04D 13/12* (2006.01)
*F04D 23/00* (2006.01)
*B60H 1/00* (2006.01)
*F04D 1/00* (2006.01)
*F02N 19/10* (2010.01)
*F24H 3/06* (2006.01)

(52) U.S. Cl.
CPC ............ *B60H 1/2209* (2013.01); *F02N 19/10* (2013.01); *F04D 1/00* (2013.01); *F04D 13/024* (2013.01); *F04D 13/028* (2013.01); *F04D 13/12* (2013.01); *F04D 23/008* (2013.01); *B60H 2001/2281* (2013.01); *B60H 2001/2284* (2013.01); *F24H 3/065* (2013.01); *Y02T 10/88* (2013.01)

(58) Field of Classification Search
USPC .................................................. 237/12.3 C
IPC ....................................................... F24H 3/065
See application file for complete search history.

(56) References Cited

U.S. PATENT DOCUMENTS

| | | | | |
|---|---|---|---|---|
| 5,232,153 A | * | 8/1993 | Mohring | F24H 9/0068 126/110 B |
| 5,249,956 A | * | 10/1993 | Chu | B60H 1/00414 126/110 B |
| 5,456,408 A | * | 10/1995 | Appel | B60H 1/2206 237/12.3 C |
| 5,653,387 A | * | 8/1997 | Takayanagi | B60H 1/2212 237/12.3 C |
| 5,727,730 A | * | 3/1998 | Habijanec | B60H 1/2212 126/110 A |
| 6,743,012 B2 | * | 6/2004 | Wolf | B60H 1/2212 165/41 |
| 9,482,330 B1 | * | 11/2016 | Holmes | H02K 99/00 |
| 2002/0117551 A1 | * | 8/2002 | Wolf | B60H 1/2212 237/12.3 C |
| 2010/0006663 A1 | * | 1/2010 | Linscheidt | F23D 11/345 237/12.3 C |
| 2012/0241529 A1 | * | 9/2012 | Wetzl | F04D 23/008 237/12.3 C |
| 2013/0192581 A1 | * | 8/2013 | Haefner | F04D 23/008 126/77 |
| 2015/0008057 A1 | * | 1/2015 | Lo | B60K 17/28 180/165 |
| 2017/0267092 A1 | * | 9/2017 | Thackwell | B60L 50/51 |
| 2018/0212490 A1 | * | 7/2018 | Guina | H02K 3/47 |

FOREIGN PATENT DOCUMENTS

| | | | | |
|---|---|---|---|---|
| DE | 196 52 970 A1 | 6/1998 | | |
| DE | 101 11 005 C1 | 10/2002 | | |
| DE | 20 2004 015 442 U1 | 2/2006 | | |
| DE | 102008051302 A1 | * | 4/2009 | ............ F04D 15/00 |
| EP | 1172561 A2 | * | 1/2002 | ............ F04C 2/102 |
| EP | 1 696 129 A2 | 8/2006 | | |
| EP | 2 028 373 A2 | 2/2009 | | |
| GB | 717 225 A | 10/1954 | | |
| JP | S62 165594 A | 10/1987 | | |

OTHER PUBLICATIONS

"DE_102008051302_A1_M—Machine Translation.pdf", machine translation, EPO.org, Sep. 20, 2019.*

"DE_202004015442_U1_H—Machine Translation.pdf", machine translation, EPO.org, Sep. 19, 2019.*

* cited by examiner

DELIVERY DEVICE FOR PROVIDING TWO MEDIUM FLOWS GUIDED SEPARATELY FROM ONE ANOTHER, ESPECIALLY IN A FUEL-OPERATED VEHICLE HEATER

CROSS REFERENCE TO RELATED APPLICATIONS

This application claims the benefit of priority under 35 U.S.C. § 119 of German Application 10 2016 115 368.0, filed Aug. 18, 2016, the entire contents of which are incorporated herein by reference.

FIELD OF THE INVENTION

The present invention pertains to a delivery device for providing two medium flows guided separately from one another, especially in a fuel-operated vehicle heater, comprising a first delivery wheel rotatable about a first rotation axis for delivering a first medium, a second delivery wheel rotatable about a second rotation axis for delivering a second medium, as well as a drive motor for driving the first delivery wheel and the second delivery wheel.

BACKGROUND OF THE INVENTION

Such a delivery device is known, for example, from DE 20 2004 015 442 U1. A drive motor configured as an electric motor is used in this prior-art delivery device to drive two delivery wheels of a fuel-operated vehicle heater. A first of these delivery wheels is used to deliver combustion air as a gaseous first medium into a burner area of the vehicle heater. A second of these delivery wheels is used to deliver heating air as a gaseous second medium in the direction of a heat exchanger unit of the vehicle heater.

SUMMARY OF THE INVENTION

An object of the present invention is to provide a delivery device for providing two medium flows guided separately from one another, especially in a fuel-operated vehicle heater, in which delivery device a reliable separation of the two medium flows can be achieved in a simple manner and it is possible to drive two delivery wheels by a common drive motor.

This object is accomplished according to the present invention by a delivery device for providing two medium flows guided separately from one another in a fuel-operated vehicle heater, comprising:—a first delivery wheel rotatable about a first rotation axis for delivering a first medium,—a second delivery wheel rotatable about a second rotation axis for delivering a second medium, and—a drive motor for driving the first delivery wheel and the second delivery wheel.

Provisions are further made for at least one delivery wheel being coupled with the drive motor via a magnetic coupling device.

A mechanical coupling, i.e., a direct physical interaction of the delivery wheel with the drive motor can be avoided by the coupling of at least one delivery wheel via a magnetic coupling device with the drive motor in association with this at least one delivery wheel. The magnetic coupling device makes it possible to couple such a delivery wheel via a magnetic force-based interaction, so that the delivery wheel, on the one hand, and the drive motor, on the other hand, may be provided, for example, in volume areas separated from one another by at least one wall, and no opening needs to be provided in this wall for the passage of a member providing the coupling of the delivery wheel, e.g., a shaft of the drive motor.

It is proposed in a variant that is especially advantageous in case of use in a drive system of a vehicle that the first delivery wheel be a gas delivery wheel for delivering a gaseous first medium and that the second delivery wheel be a liquid delivery wheel for delivering a liquid second medium, and that the second delivery wheel be coupled with the drive motor via the magnetic coupling device.

For delivering combustion air as a gaseous first medium to a burner area of a fuel-operated vehicle heater, a configuration proved to be advantageous, in which provisions can be made for providing, in association with the first delivery wheel, a delivery duct, which extends in a ring-shaped manner about the first rotation axis and is open in the direction of the first rotation axis, with a medium outlet separated from a medium inlet by an interrupter area, and for the first delivery wheel comprising a ring-shaped delivery area axially covering the delivery duct with a plurality of delivery blades following one another in the circumferential direction about the first rotation axis. Consequently, a delivery area of the delivery device is configured here in the manner of a side-channel blower in interaction of the delivery wheel with the delivery duct.

For delivering a liquid second medium, it is proposed that the second delivery wheel be carried rotatably about the second rotation axis in a flow duct for the second medium, wherein the flow duct preferably has a feed duct area leading to the second delivery wheel essentially in the direction of the second rotation axis and a discharge duct area leading away from the second delivery wheel in the radial direction.

To make it possible to provide a closed flow volume for the gaseous first medium, it is proposed that the first delivery wheel be arranged in a space area enclosed by a second housing, wherein the second housing is preferably permanently connected to the first housing for providing a tight closure.

For a defined, stable positioning of the second delivery wheel for delivering the liquid second medium, provisions may be made for a bearing journal extending in the flow duct in the direction of the second rotation axis to be provided for the second delivery wheel, wherein the bearing journal is carried preferably on the second housing such that it is preferably not rotatable about the second rotation axis and it provides for a rotatable mounting of the second delivery wheel.

The drive motor may comprise a rotor device with a rotor shaft. One of the delivery wheels is preferably coupled mechanically with the rotor shaft in such a configuration, while the other delivery wheel is coupled with the rotor shaft via the magnetic coupling device. It should be noted here that a mechanical coupling is defined in the sense of the present invention as at least any coupling not allowing any slip between the delivery wheel and the rotor shaft, i.e., for example, a coupling generated, for example, by a frictional coupling engagement, by a tooth-like meshing, a connection in substance, e.g., bonding, or by a coupling provided by a transmission.

To achieve coupling of at least one of the delivery wheels, which is generated by magnetic force, it is proposed that the drive motor comprise a rotor device with a rotor shaft, and that the magnetic coupling device comprise a drive magnet device coupled mechanically with the rotor shaft and a driven magnet device coupled with the at least one delivery wheel coupled with the drive motor via the magnetic coupling device. At least one of the magnet devices preferably comprises here at least one permanent magnet.

For a simple, stable configuration, provisions may be made for the drive magnet be connected nonrotatingly to the rotor shaft. A direct coupling of the drive magnet device with the rotor shaft or/and a coupling via the first delivery wheel may be provided here.

In an alternative embodiment, the drive magnet device may be coupled with the rotor shaft via a transmission device. It can be ensured in this manner that the two delivery wheels can rotated at mutually different speeds of rotation.

The transmission device may comprise a planet gear, wherein the planet gear may preferably be configured with a sun wheel connected to the rotor shaft for joint rotation, with a pinion cage, which is connected to the drive magnet device for joint rotation or is provided by the drive magnet device, with a plurality of planet gears meshing with the sun wheel, and with a ring gear, which is not rotatable about the first rotation axis and the second rotation axis and meshes with the planet gears.

The ring gear may be provided at the second housing in an embodiment that can have an especially simple configuration.

The first rotation axis and the second rotation axis may correspond to each other, so that the two delivery wheels are indeed driven for rotation about a common rotation axis. The drive motor is preferably an electric motor with a stator device, which may have one or more stator windings, and a rotor device, which may have a rotor shaft, via which the coupling to the delivery wheels is brought about.

The present invention further pertains to a drive system for a vehicle, comprising a drive unit, a cooling medium circuit for guiding liquid cooling medium through the drive unit and a fuel-operated vehicle heater with a delivery device according to the present invention, wherein the second delivery wheel is provided for delivering cooling medium of the cooling medium circuit as the second medium to a heat exchanger unit of the vehicle heater and wherein the first delivery wheel is provided for delivering combustion air as the first medium to a burner area of the vehicle heater.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
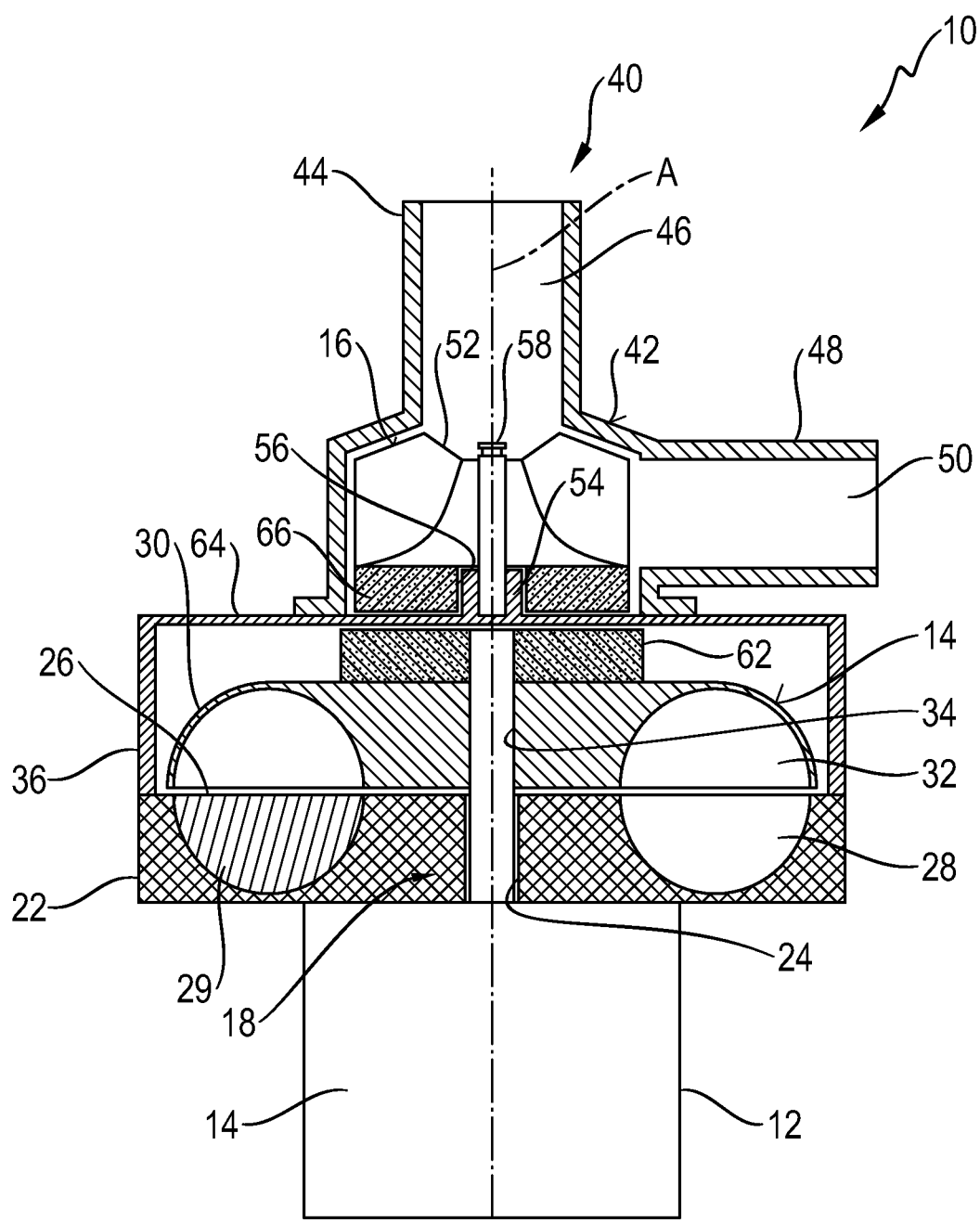
FIG. 1 is a sectional view of a delivery device for providing two medium flows guided separately from one another.
Figure 2:
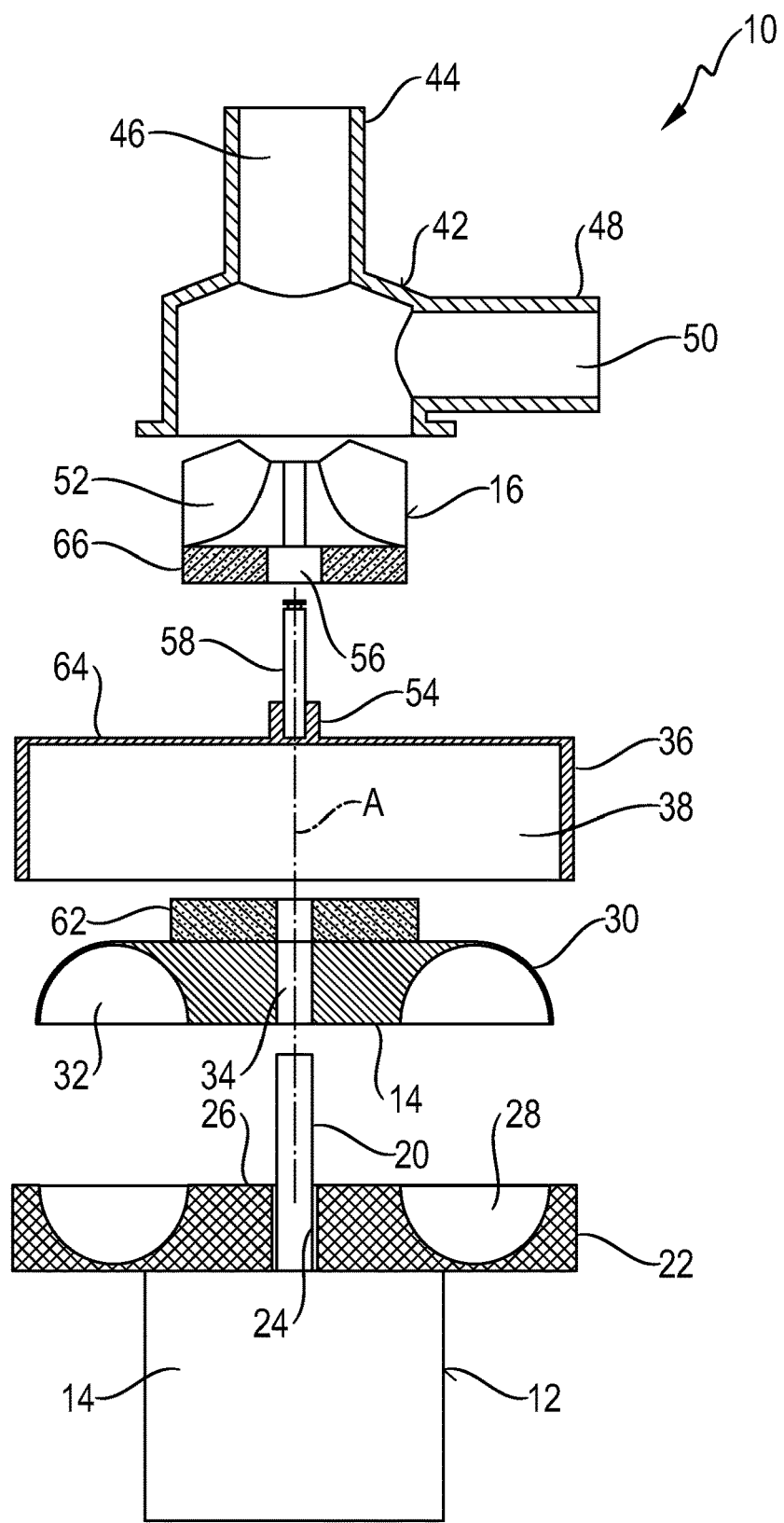
FIG. 2 is the delivery device from FIG. 1 in an exploded sectional view.
Figure 3:
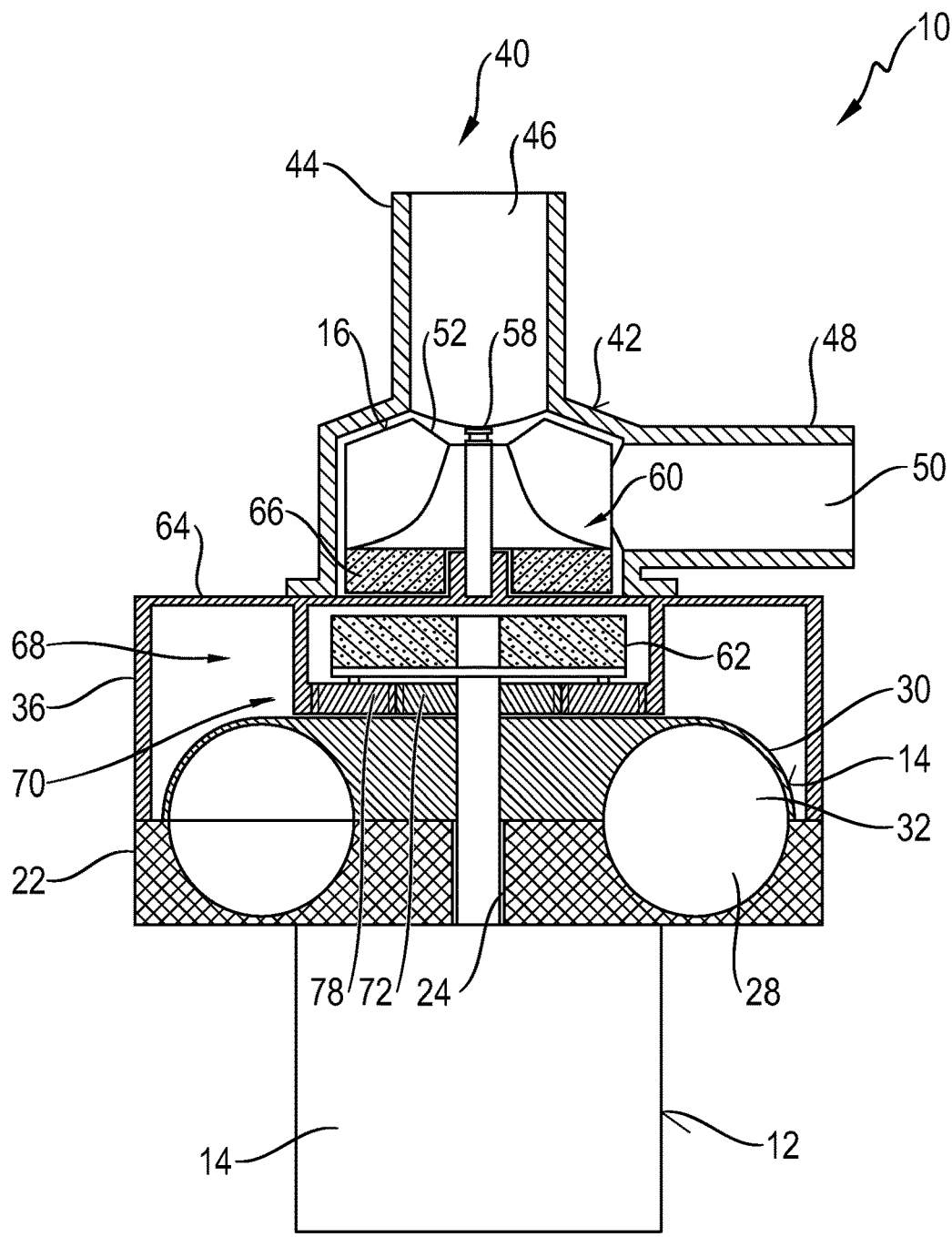
FIG. 3 is a view of an alternative type of embodiment of the delivery device, which view corresponds to FIG. 1.
Figure 4:
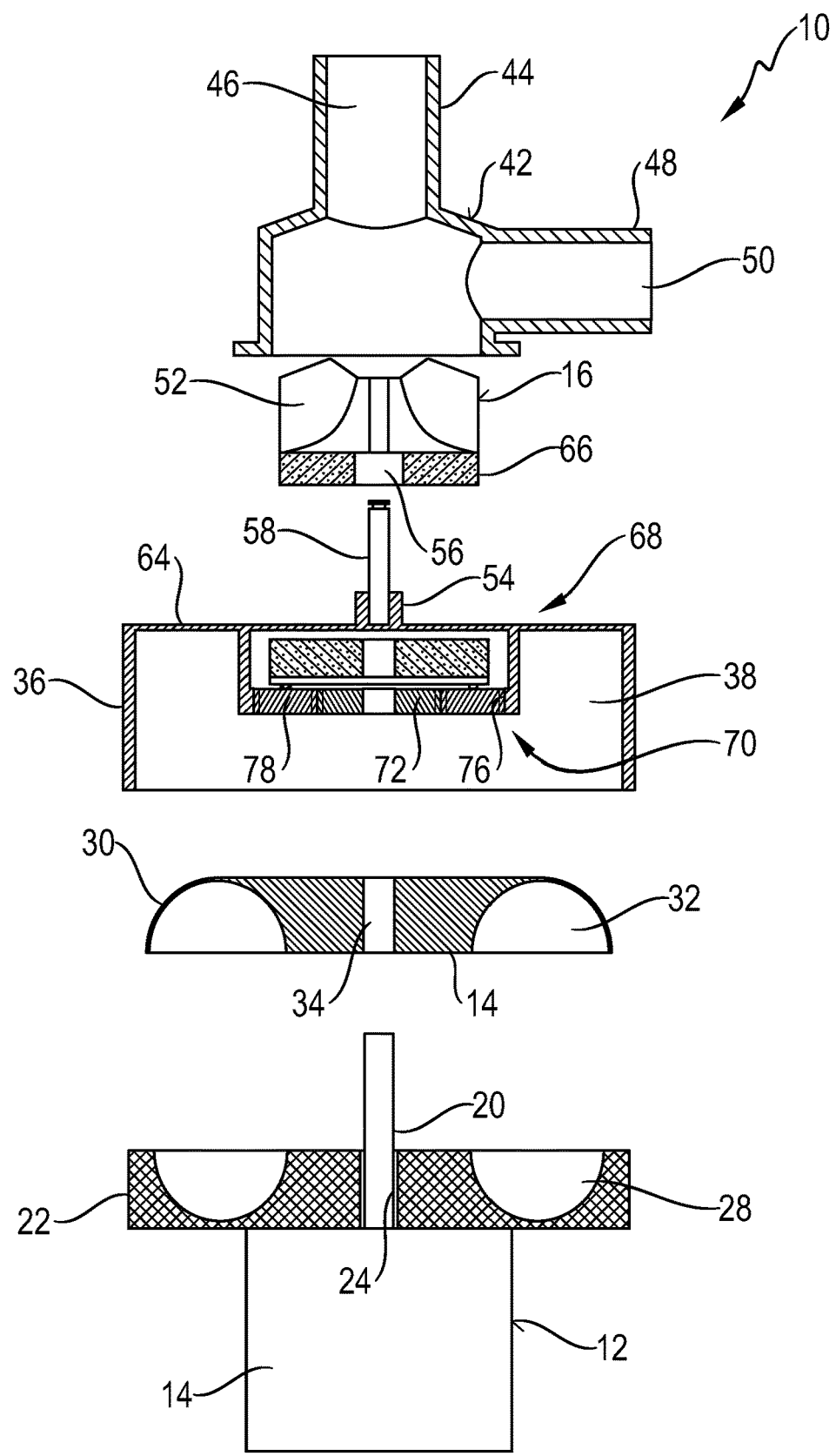
FIG. 4 is the delivery device from FIG. 3 in an exploded sectional view.
Figure 5:
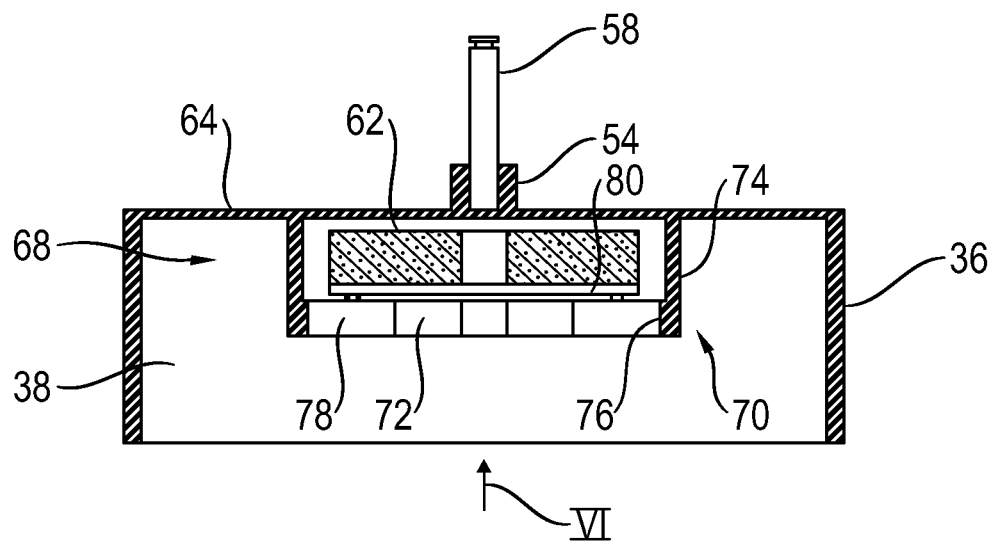
FIG. 5 is a housing of the delivery device from FIG. 3, which housing carries a planet gear and a drive magnet device.
Figure 6:
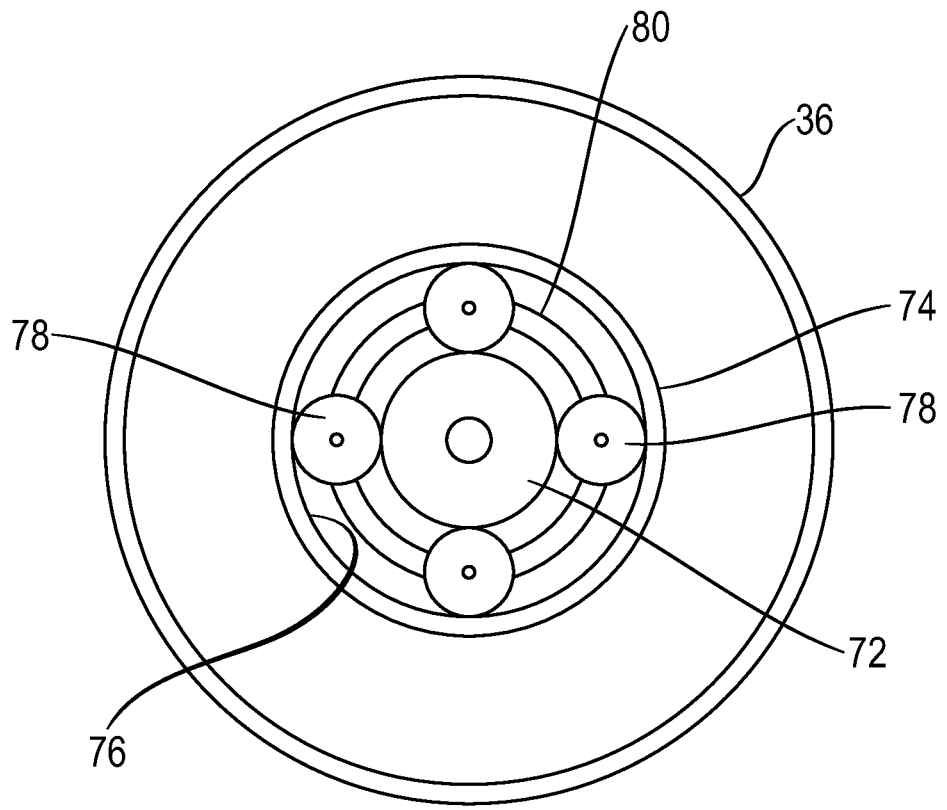
FIG. 6 is an axial view of the housing from FIG. 5 in direction of view VI in FIG. 5.

Referring to the drawings, FIGS. 1 and 2 show a first type of embodiment of a delivery device generally designated by 10. The delivery device 10 comprises a drive motor 12, which is configured as an electric motor and by which a first delivery wheel 14 and a second delivery wheel 16 can be driven for rotation about a common rotation axis A. The drive motor 12 comprises in a motor housing 14 a stator device with one or more electrically energizable stator windings and a rotor device 18 rotatable in the motor housing 14 with a rotor shaft 20.

The motor housing 12 is connected to a first housing 22 of the delivery device 10 or may also be provided, for example, by an integral component of the first housing 22. An opening 24, through which the rotor shaft 20 extends in the direction of the rotation axis A, is provided in the first housing 22, so that the rotor shaft projects from the first housing 22 on an axial side 26 of said first housing, which said axial side faces away from the motor housing 12.

A delivery duct 28 extending in a ring-shaped manner about the rotation axis A is formed in the first housing 22. In an interrupter area 29, the delivery duct 28 is interrupted in the circumferential direction. A medium inlet, via which a gaseous first medium to be delivered by the first delivery wheel 14, i.e., for example, the combustion air for a fuel-operated vehicle heater, can enter the delivery duct 28, and a medium outlet, through which the first medium again leaves the delivery duct 28, are separated from one another in the circumferential direction by the interrupter area. The delivery wheel 14 has, in association with the ring-shaped delivery duct 28, a correspondingly ring-shaped delivery area 30 with a plurality of delivery blades 32 that are provided thereon in the circumferential direction and follow one another. Together with the delivery duct 28, the delivery wheel 14 forms a delivery area of the delivery device 10, which delivery area is configured in the manner of a side-channel blower.

The rotor shaft 20 of the drive motor 12 extends through an opening 34 provided in the delivery wheel 14 in the example shown in FIGS. 1 and 2. The delivery wheel 14 is connected to the rotor shaft 20 directly, mechanically for joint rotation about the rotation axis A with said rotor shaft. For example, the rotor shaft 20 may be received in the opening 34 by press fit. Tooth-like meshing or a permanent, mechanical connection by bonding or the like is also possible.

The delivery wheel 14 is received in a space area 38 enclosed by a second housing 36 connected permanently and in a fluid-tight manner to the first housing 22, for example, radially outside the delivery wheel 14 and of the delivery duct 28. A flow duct element 42 providing a flow duct 40 for a liquid second medium is carried on this second housing 36 in a permanent and fluid-tight manner. The flow duct element 42 provides in a first pipe section 44 a feed duct area 46 leading to the second delivery wheel 16 essentially in the direction of the rotation axis A and provides in a second pipe section 48 a discharge duct area 50 leading essentially radially away from the second delivery wheel 16 in the example being shown. The liquid second medium to be delivered by the second delivery wheel 16 flows over the feed duct area 46 in the direction of the rotation axis A towards the second delivery wheel 16 and is delivered into the discharge duct area 50 during the rotation of the second delivery wheel 16 by a plurality of delivery blades 52 following one another on said second delivery wheel about the rotation axis A in the circumferential direction.

A bearing journal 58 for the second delivery wheel 16 is carried permanently on a housing attachment 54 of the second housing 36. For example, the bearing journal 58 may be pressed into the housing attachment 54 or/and fixed thereon by connection in substance, for example, bonding. The second delivery wheel 16 is mounted, in principle, freely rotatably on the bearing journal 58, for example, by means of a slide bearing.

To make it also possible to drive the second delivery wheel 16 not coupled mechanically with the drive motor 12 by the drive motor 12 for rotation about the rotation axis A, a magnetic coupling device generally designated by 60 is provided. This comprises a drive magnet device 62, for example, with one or more permanent magnets, which drive magnet device 62 is coupled for joint rotation with the rotor shaft 20 or with the first delivery wheel 14 carried nonrotatingly thereon. These permanent magnets may be arranged, for example, in a housing made of a plastic material or the like, which housing encloses them. The rotor shaft 20 meshes with this housing or optionally also with a permanent magnet having a disk-shaped configuration. The drive magnet device 62 may thus be connected to the drive shaft 20 directly nonrotatingly, for example, by press fit, bonding or the like, but, in addition or as an alternative, it may also be connected nonrotatingly with the first delivery wheel 14. The drive magnet device 62 is located in a space area 38 enclosed by the second housing 36 and is thus separated by the second housing 36, especially by a wall 64 thereof, which wall also has the housing attachment 54, from the second delivery wheel 16 and also from the flow duct 40 for the medium, which said flow duct is formed in the flow duct element 42.

A driven magnet device 66 of the magnetic coupling device 60 is provided on the second delivery wheel 16. This device may also comprise one or more permanent magnets, which are embedded, for example, in a housing made of a plastic material. Such a housing may be permanently connected to the second delivery wheel 16, which is likewise made, for example, of a plastic material, for example, by bonding or the like. One or more permanent magnets also could, in principle, be embedded in the material of which the second delivery wheel 16 is made or fixed directly on the second delivery wheel 16. The bearing journal 58 and, for example, also the housing attachment 54 pass through an opening 56 in the driven magnet device 66, so that the second delivery wheel 16 is carried rotatingly on the bearing journal 58, supported, for example, axially on the housing attachment 54.

Due to the magnetic force acting between the two magnet devices 62, 66, these are coupled with one another for joint rotation, so that the driven magnet device 66 is also driven for rotation about the rotation axis A during rotation of the shaft 20 and hence during rotation of the drive magnet device 62 and the second delivery wheel 16 will thus also rotate about the rotation axis A. It is thus possible, without there being a direct, mechanical coupling between the second delivery wheel 16 and the drive motor 12, to arrange this second delivery wheel in the flow duct 40 for the liquid second medium and to drive it for rotation about the rotation axis A by the drive motor 12, which also drives the first delivery wheel 14 for rotation. This makes possible, on the one hand, a reliable separation of the two medium flows, especially also by the second housing 36 in the example being shown, but, on the other hand, it ensures that both delivery wheels 14, 16 are driven reliably for rotation about the rotation axis A in case of energization of the drive motor 12.

An alternative embodiment of such a delivery device is shown in FIGS. 3 through 6. Components or assembly units that correspond to above-described components or assembly units in terms of their configuration or their function are designated here by the same reference numbers.

The second delivery wheel 16 is coupled with the drive motor 12 or the drive shaft 20 thereof for joint rotation about the rotation axis A via the magnetic coupling device 60 in the configuration shown in FIGS. 3 through 6 as well. The magnetic coupling device 60 again has the drive magnet drive 62 arranged in the space area 38 and the driven magnet device 66 received together with the delivery wheel 16 in the flow duct 40 or in the flow duct element 42 here as well. The coupling of the first delivery wheel 14 with the rotor shaft 20 of the drive motor 12 and the interaction of that delivery wheel with the ring duct 28 in the housing 22 are also such as were described above with reference to FIGS. 1 and 2.

However, unlike in the embodiment described above, the drive magnet device 62 is not connected nonrotatingly with the rotor shaft 20, but it is connected to this via a transmission device generally designated by 68 and can be driven by the rotor shaft 20 via the transmission device 68 for rotation about the rotation axis A. In the example being shown, the transmission device 68 comprises a planet gear 70 with a sun wheel 72 connected permanently to the rotor shaft 20 or/and to the first delivery wheel 14 for joint rotation. An attachment 74, which is, for example, essentially cylindrical, extends essentially in the direction of the rotation axis A into the space area 38 and provides a ring gear 76 in its end area located at a distance from the wall 64, is provided on the second housing 36 or the wall 64 thereof. Four planet gears 78, which are arranged, for example, at uniformly spaced locations from one another in the circumferential direction, and which mesh with both the sun wheel 72 and the ring gear 76, are provided between the sun wheel 72 and the ring gear 76 in the example being shown. The planet gears 78 are carried freely rotatably about rotation axes that are essentially parallel to the rotation axis A on a pinion cage 80, which has, for example, a ring-shaped configuration. The pinion cage 80 is, in turn, fixed on the drive magnet device 62 or forms a part of it, so that the drive magnet device 62 also rotates correspondingly about the rotation axis A during rotation of the pinion 80 about the rotation axis A. This rotation is brought about by the fact that based on the rotatable arrangement of the ring gear 76 on the second housing 36, the planet gears 78, which are put into rotation due to the meshing with the sun wheel 72, roll on the ring gear 76 during rotation of the sun wheel 72 about the rotation axis A and drive the pinion cage 80 for rotation about the rotation axis A during the rolling motion. In the exemplary embodiment shown in FIG. 6, in which a diameter ratio or tooth number ratio of 2/1 is provided between the ring gear and the sun wheel, a rotation of the sun wheel 72 at a predefined speed of rotation leads to a rotation of the second delivery wheel 16 in the same rotation direction at a speed that corresponds to one third of the speed of rotation of the sun wheel and hence to one third of the speed of rotation of the first delivery wheel 14 or of the rotor shaft 20.

It thus becomes possible due to the dimensioning of the different components of the planet gear 70 to preset the speed of rotation for the second delivery wheel 16 differently from the speed of rotation of the first delivery wheel 14.

Figure 7:
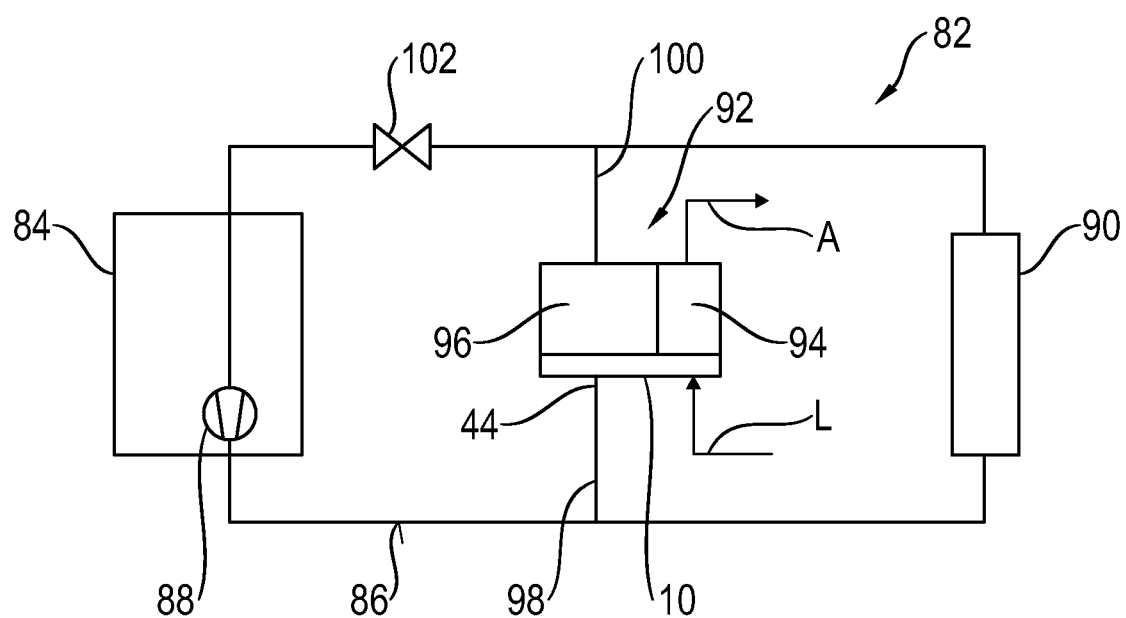
FIG. 7 is a schematic diagram of a drive system for a vehicle with a vehicle heater equipped with a delivery device according to FIGS. 1 through 6.

The integration of an above-described delivery device 10 in a drive system of a vehicle will be explained below with reference to FIG. 7 on the basis of a schematic view. This drive system, generally designated by 82, comprises a drive unit 84, configured, for example, as an internal combustion engine, and, associated with it, a cooling medium circuit 86 for a generally liquid cooling medium, i.e., for example, water or the like, which is also sent through a water jacket of the drive unit 84. The cooling medium may be driven to circulate in the cooling medium circuit 86 by a cooling medium pump 88. The cooling medium circuit 86 is also sent through a heat exchanger unit 96 generally called cooler. Heat generated in the drive unit 84 can be released in it in order to cool the cooling medium and the drive unit 84. This heat can be transferred, for example, to air that is flowing through the cooler 90 and is to be introduced into the interior of a vehicle.

The drive system 82 further comprises a fuel-operated vehicle heater generally designated by 92. The vehicle heater 92 comprises a burner area 94 as well as a heat exchanger unit 96. The above-described delivery device 10 is provided in association with the vehicle heater 92. The first pipe section 44 is connected to the cooling medium circuit 86 via a branch line 98. The heat exchanger unit 96 is likewise connected to the cooling medium circuit 86 via another branch line 100, so that the heat exchanger unit 96 is connected in the cooling medium circuit 86 essentially parallel to the cooler 90 and also to the drive unit 84. The second pipe section 48 of the delivery device 10, which pipe section sends the liquid medium being delivered by the second delivery wheel 16, i.e., the cooling medium of the cooling medium circuit 86, into the heat exchanger unit 96, cannot be seen in FIG. 7.

The combustion air indicated by an arrow L is delivered by the first delivery wheel 14 in the direction of the burner area 94, is mixed with fuel there and is burned in the burner area 94 to provide heat. The waste gases B released in the process leave the burner area 94 via a waste gas routing system, not shown.

With the drive unit 84 running, the heat generated in it can be released via the cooler 90 during the operation of the drive system 7. If operation of the vehicle heater 92 is not necessary, the delivery device 10 remains deactivated, so that there is essentially no flow through the two branch lines 98, 100 based on the markedly higher flow resistance compared to the cooler 90 and the total amount of cooling medium circulating in the cooling medium circuit 86 also flows essentially through the cooler 90. If, for example, the interior of the vehicle is to be heated in a parking heater operating mode, i.e., with the drive unit 84 deactivated, the vehicle heater 92 can be put into operation. The delivery device 86 is also activated in this state, so that the cooling medium of the cooling medium circuit 86 is delivered through the heat exchanger unit 96, on the one hand, and the combustion air L is fed into the burner area 94 by the first delivery wheel 14, on the other hand. To ensure a defined flow through the cooler 90 now, the flow through the drive unit 84 can be prevented via a valve 102. If the valve 102 is brought into a valve position in which the flow to the drive unit 84 is released, the cooling medium heated in the heat exchanger unit 96 of the vehicle heater 92 can also flow through the drive unit 84 and preheat this before the start of the operation. To ensure now, for example, that only the drive unit 84 is heated, a valve may also be arranged in the flow area between the vehicle heater 92 and the cooler 90, and this valve is switched in this case such that it is shut off in order to ensure that there is no flow through the cooling device 90, but the total amount of the cooling medium flowing through the heat exchanger unit 96 flows through the drive unit 84. For example, the cooling medium pump 88 may also be operated in a supporting manner in this state.

While specific embodiments of the invention have been shown and described in detail to illustrate the application of the principles of the invention, it will be understood that the invention may be embodied otherwise without departing from such principles.

What is claimed is:

1. A fuel-operated vehicle heater delivery device for providing medium flows guided separately from one another, the delivery device comprising:
    a first delivery wheel rotatable about a first rotation axis for delivering a first medium;
    a second delivery wheel rotatable about a second rotation axis for delivering a second medium;
    a drive motor for driving the first delivery wheel and the second delivery wheel; and
    a magnetic coupling device, at least one of the first delivery wheel and second delivery wheel being coupled with the drive motor via the magnetic coupling device, the first delivery wheel comprising a gas delivery wheel for delivering a gaseous first medium, the second delivery wheel comprising a liquid delivery wheel for delivering a liquid second medium, the second delivery wheel being coupled with the drive motor via the magnetic coupling device;
    a first housing with a delivery duct associated with the first delivery wheel, the delivery duct extending with a ring-shape about the first rotation axis, the delivery duct being open in a direction of the first rotation axis, the delivery duct having a medium outlet separated from a medium inlet by an interrupter area, the first delivery wheel comprising a ring-shaped delivery area axially covering the delivery duct with a plurality of delivery blades following each other in a circumferential direction about the first rotation axis and the second delivery wheel being carried rotatably about the second rotation axis in a flow duct for the second medium and the flow duct having a feed duct area leading towards the second delivery wheel, essentially in a direction of the second rotation axis, and a discharge duct area leading away from the second delivery wheel in a radial direction, the first delivery wheel being arranged in a space area enclosed by a second housing and the second housing is connected permanently to the first housing for providing a tight closure and a bearing journal extends in the direction of the second rotation axis for the second delivery wheel in the flow duct and the bearing journal being carried on the second housing such that the bearing journal is not rotatable about the second rotation axis and the bearing journal rotatably mounts the second delivery wheel on the second housing.

2. The delivery device in accordance with claim 1, wherein:
    the drive motor comprises a rotor device with a rotor shaft; and
    one of the first delivery wheel and the second delivery wheel is mechanically coupled with the rotor shaft, and the other of the first delivery wheel and the second delivery wheel is coupled with the rotor shaft via the magnetic coupling device.

3. The delivery device in accordance with claim 1, wherein:
the drive motor comprises a rotor device with a rotor shaft; and
the magnetic coupling device comprises a drive magnet device mechanically coupled with the rotor shaft and a driven magnet device coupled with the at least one at least of the first delivery wheel and second delivery wheel is coupled with the drive motor via the magnetic coupling device.

4. The delivery device in accordance with claim 3, wherein:
the drive magnet device comprises at least one permanent magnet; or
the driven magnet device comprises at least one permanent magnet; or
the drive magnet device comprises at least one permanent magnet and the driven magnet device comprises at least one permanent magnet.

5. The delivery device in accordance with claim 3, wherein the drive magnet device is nonrotatingly connected to the rotor shaft.

6. The delivery device in accordance with claim 3, wherein the drive magnet device is coupled with the rotor shaft via a transmission device.

7. The delivery device in accordance with claim 6, wherein the transmission device comprises a planet gear arrangement comprising:
a sun wheel connected to the rotor shaft for joint rotation;
a pinion cage connected to the drive magnet device for joint rotation or provided by the drive magnet device;
a plurality of planet gears meshing with the sun wheel; and
a ring gear rotatable about the first rotation axis and the second rotation axis and meshing with the planet gears.

8. The delivery device in accordance with claim 1, further comprising:
a first housing with a delivery duct associated with the first delivery wheel; and
a second housing, wherein:
the first delivery wheel is arranged in a space area enclosed by a second housing and the second housing is connected permanently to the first housing for providing a tight closure; and
a ring gear is provided on the second housing.

9. The delivery device in accordance with claim 1, wherein:
the first rotation axis corresponds to the second rotation axis; or
the drive motor is an electric motor with a stator device and with rotor device with a rotor shaft; or
the first rotation axis corresponds to the second rotation axis and the drive motor is an electric motor with a stator device and with rotor device with a rotor shaft.

10. A drive system for a vehicle, comprising:
a drive unit;
a cooling medium circuit for guiding liquid cooling medium through the drive unit; and
a fuel-operated vehicle heater comprising:
a delivery device comprising:
a first delivery wheel rotatable about a first rotation axis for delivering a first medium;
a second delivery wheel rotatable about a second rotation axis for delivering a second medium;
a drive motor for driving the first delivery wheel and the second delivery wheel; and a magnetic coupling device, at least one of the first delivery wheel and second delivery wheel being coupled with the drive motor via the magnetic coupling device, the first delivery wheel comprising a gas delivery wheel for delivering a gaseous first medium, the second delivery wheel comprising a liquid delivery wheel for delivering a liquid second medium, the second delivery wheel being coupled with the drive motor via the magnetic coupling device;
a first housing with a delivery duct associated with the first delivery wheel, the delivery duct extending with a ring-shape about the first rotation axis, the delivery duct being open in a direction of the first rotation axis, the delivery duct having a medium outlet separated from a medium inlet by an interrupter area, the first delivery wheel comprising a ring-shaped delivery area axially covering the delivery duct with a plurality of delivery blades following each other in a circumferential direction about the first rotation axis and the second delivery wheel being carried rotatably about the second rotation axis in a flow duct for the second medium and the flow duct having a feed duct area leading towards the second delivery wheel, essentially in a direction of the second rotation axis, and a discharge duct area leading away from the second delivery wheel in a radial direction, the first delivery wheel being arranged in a space area enclosed by a second housing and the second housing is connected permanently to the first housing for providing a tight closure and a bearing journal extends in the direction of the second rotation axis for the second delivery wheel in the flow duct and the bearing journal being carried on the second housing such that the bearing journal is not rotatable about the second rotation axis and the bearing journal rotatably mounts the second delivery wheel on the second housing, wherein the second delivery wheel is provided for delivering cooling medium of the cooling medium circuit, as the second medium, to a heat exchanger unit of the vehicle heater, and the first delivery wheel is provided for delivering combustion air as the first medium to a burner area of the vehicle heater.

11. The drive system in accordance with claim 10, wherein:
the drive motor comprises a rotor device with a rotor shaft; and
one of the first delivery wheel and the second delivery wheel is mechanically coupled with the rotor shaft, and the other of the first delivery wheel and the second delivery wheel is coupled with the rotor shaft via the magnetic coupling device.

12. The drive system in accordance with claim 10, wherein:
the drive motor comprises a rotor device with a rotor shaft; and
the magnetic coupling device comprises a drive magnet device mechanically coupled with the rotor shaft and a driven magnet device coupled with the at least one at least of the first delivery wheel and second delivery wheel is coupled with the drive motor via the magnetic coupling device.

13. The drive system in accordance with claim 12, wherein:
the drive magnet device comprises at least one permanent magnet; or
the driven magnet device comprises at least one permanent magnet; or the drive magnet device comprises at least one permanent magnet and the driven magnet device comprises at least one permanent magnet.

14. The drive system in accordance with claim 12, wherein the drive magnet device is coupled with the rotor shaft via a transmission device, wherein the transmission device comprises a planet gear arrangement comprising:
a sun wheel connected to the rotor shaft for joint rotation;
a pinion cage connected to the drive magnet device for joint rotation or provided by the drive magnet device;
a plurality of planet gears meshing with the sun wheel; and
a ring gear rotatable about the first rotation axis and the second rotation axis and meshing with the planet gears.

15. A fuel-operated vehicle heater delivery device for providing medium flows guided separately from one another, the delivery device comprising:
a first delivery wheel rotatable about a first rotation axis for delivering a first medium;
a second delivery wheel rotatable about a second rotation axis for delivering a second medium;
a drive motor for driving the first delivery wheel and the second delivery wheel; and
a magnetic coupling device, at least one of the first delivery wheel and second delivery wheel being coupled with the drive motor via the magnetic coupling device, the first delivery wheel comprising a gas delivery wheel for delivering a gaseous first medium, the second delivery wheel comprising a liquid delivery wheel for delivering a liquid second medium, the second delivery wheel being coupled with the drive motor via the magnetic coupling device;
a first housing with a delivery duct associated with the first delivery wheel,;
a second housing comprising a second housing interior space, the first delivery wheel being arranged in the second housing interior space, the first housing being in contact with the second housing.

16. The delivery device in accordance with claim 15, wherein the delivery duct extends with a ring-shape about the first rotation axis, the delivery duct being open in a direction of the first rotation axis, the delivery duct having a medium outlet separated from a medium inlet by an interrupter area, the first delivery wheel comprising a ring-shaped delivery area axially covering the delivery duct with a plurality of delivery blades following each other in a circumferential direction about the first rotation axis and the second delivery wheel being carried rotatably about the second rotation axis in a flow duct for the second medium and the flow duct having a feed duct area leading towards the second delivery wheel, essentially in a direction of the second rotation axis, and a discharge duct area leading away from the second delivery wheel in a radial direction, wherein the second housing is connected permanently to the first housing for providing a tight closure and a bearing journal extends in the direction of the second rotation axis for the second delivery wheel in the flow duct and the bearing journal being carried on the second housing such that the bearing journal is not rotatable about the second rotation axis and the bearing journal rotatably mounts the second delivery wheel on the second housing.

17. The delivery device in accordance with claim 16, wherein at least a portion of the bearing journal extends axially beyond the second housing with respect to a longitudinal axis of the second housing.

18. The delivery device in accordance with claim 16, wherein the magnetic coupling device comprises a drive magnet device, the drive magnet device being located adjacent to at least a portion of the second housing, the drive magnet device being located at a spaced location from the first housing.

19. The delivery device in accordance with claim 16, wherein the magnetic coupling device comprises a drive magnet device, the drive magnet device being located in the second housing interior space.

20. The delivery device in accordance with claim 16, wherein the magnetic coupling device comprises a drive magnet device, the drive magnet device being located adjacent to at least a portion of the second housing.

* * * * *